(12) United States Patent
Guo

(10) Patent No.: US 11,551,726 B2
(45) Date of Patent: Jan. 10, 2023

(54) VIDEO SYNTHESIS METHOD TERMINAL AND COMPUTER STORAGE MEDIUM

(71) Applicant: BEIJING DAJIA INTERNET INFORMATION TECHNOLOGY CO., LTD., Beijing (CN)

(72) Inventor: Shaoze Guo, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 3 days.

(21) Appl. No.: 17/257,560

(22) PCT Filed: Sep. 17, 2019

(86) PCT No.: PCT/CN2019/106251
§ 371 (c)(1),
(2) Date: Dec. 31, 2020

(87) PCT Pub. No.: WO2020/103548
PCT Pub. Date: May 28, 2020

(65) Prior Publication Data
US 2021/0249052 A1    Aug. 12, 2021

(30) Foreign Application Priority Data
Nov. 21, 2018   (CN) .......................... 201811392903.3

(51) Int. Cl.
*G11B 27/34*   (2006.01)
*G06K 9/62*    (2022.01)
(Continued)

(52) U.S. Cl.
CPC ............ *G11B 27/34* (2013.01); *G06K 9/6256* (2013.01); *G06V 20/40* (2022.01); *G11B 27/036* (2013.01);
(Continued)

(58) Field of Classification Search
USPC .................................. 386/239–248, 278–290
See application file for complete search history.

(56) References Cited

U.S. PATENT DOCUMENTS 7,512,886 B1 *   3/2009   Herberger .............. G11B 27/34
                                              715/723
9,767,850 B1 *   9/2017   Brough ................. G11B 27/10
(Continued)

FOREIGN PATENT DOCUMENTS

CN    104202540 A    12/2014
CN    105227864 A     1/2016
(Continued)

OTHER PUBLICATIONS

International Search Report from PCT/CN2019/106251 dated Nov. 20, 2019.
(Continued)

*Primary Examiner* — Hung Q Dang
(74) *Attorney, Agent, or Firm* — Foley & Lardner LLP

(57) ABSTRACT

The disclosure provides a video synthesis method, a terminal and a storage medium. The method includes acquiring at least one video clip. The method includes acquiring a target audio suitable to video content based on the video content and the number of the at least one video clip. T number of the audio change points of the target audio is greater than or equal to the number of at least one video clip minus one, and the audio change points comprise time points at which change in audio feature satisfies a preset condition; and obtaining a video file by synthesizing the at least one video clip and the target audio based on the audio change points included in the target audio.

17 Claims, 2 Drawing Sheets

(51) Int. Cl.
*G06V 20/40* (2022.01)
*G11B 27/036* (2006.01)
*H04N 5/265* (2006.01)
*H04N 21/439* (2011.01)
*G11B 27/28* (2006.01)
*H04N 21/44* (2011.01)
*H04N 21/845* (2011.01)
*G11B 27/031* (2006.01)

(52) U.S. Cl.
CPC ......... *H04N 5/265* (2013.01); *H04N 21/4394* (2013.01)

(56) References Cited

U.S. PATENT DOCUMENTS

| | | | | |
|---|---|---|---|---|
| 2006/0204214 A1* | 9/2006 | Shah | ................... | G11B 27/036 386/282 |
| 2012/0251082 A1* | 10/2012 | Devos | ................. | H04N 9/8211 386/285 |
| 2015/0113408 A1* | 4/2015 | Eppolito | ............. | G11B 27/031 715/726 |
| 2015/0139613 A1* | 5/2015 | Mondelore | ............ | A63F 13/63 386/280 |
| 2015/0287229 A1 | 10/2015 | Sela et al. | | |
| 2016/0139871 A1* | 5/2016 | Farshi | ................... | H04N 9/806 386/201 |
| 2016/0259788 A1* | 9/2016 | Jamieson | .............. | G06F 16/739 |
| 2017/0092323 A1* | 3/2017 | Goldman | ............... | G11B 27/10 |
| 2018/0166067 A1* | 6/2018 | Dimitriadis | ............ | G10L 15/04 |
| 2019/0042900 A1* | 2/2019 | Smith | ............... | G06K 9/00993 |

FOREIGN PATENT DOCUMENTS

| | | | | |
|---|---|---|---|---|
| CN | 107393569 A | 11/2017 | | |
| CN | 107770626 A | 3/2018 | | |
| CN | 107888963 A | 4/2018 | | |
| CN | 108012190 A | 5/2018 | | |
| CN | 108322638 A | 7/2018 | | |
| CN | 108419035 A | 8/2018 | | |
| CN | 109379643 A | 2/2019 | | |
| CN | 107393569 B | * 10/2019 | .......... | G11B 27/031 |
| JP | H10-507555 A | 7/1998 | | |

OTHER PUBLICATIONS

Office Action for corresponding China Patent No. 201811392903.3, (with English translation), dated Oct. 25, 2019, 8 pages.
Notification to Grant for corresponding China Patent No. 201811392903.3, (with English translation), dated Apr. 16, 2020 (with English translation), 3 pages.

* cited by examiner ically to an example implementation of the disclosure;
VIDEO SYNTHESIS METHOD TERMINAL AND COMPUTER STORAGE MEDIUM

CROSS-REFERENCE TO RELATED APPLICATIONS

This application is the 371 application of PCT Application No. PCT/CN2019/106251, filed on Sep. 17, 2019, which claims the priority of the Chinese Patent Application No. 201811392903.3, filed with China National Intellectual Property Administration on Nov. 21, 2018, the disclosures of which are herein incorporated by reference in their entireties.

TECHNICAL FIELD

The disclosure relates to the field of video processing, and in particular to a video synthesis method, device, terminal, and computer storage medium.

BACKGROUND

With the development of the Internet, more and more users like to publish videos on the Internet. Most of these videos are obtained through video synthesis. For example, these videos may contain multiple video clips and are equipped with corresponding background music.

Related technologies synthesize multiple video clips into a video with background music. Generally, the following process is required: user selects multiple video clips on the terminal, selects a piece of music that is suitable for contents of the multiple video clips as background music by watching the contents of the multiple video clips, and then the multiple video clips and the background music are combined into a video by using a video synthesis application on the terminal.

In the video synthesis process of the above technology, users often need to try to play multiple pieces of music in order to find out background music suitable for the contents of multiple video clips. Therefore, in order to improve the efficiency of video synthesis, a video synthesis method is urgently needed, when multiple video clips are synthesized into a video with background music.

SUMMARY

According to the first aspect of the implementations of the disclosure, a video synthesis method is provided. The video synthesis method includes acquiring at least one video clip. The method includes acquiring a target audio suitable to video content based on the video content and the number of the at least one video clip. The number of the audio change points of the target audio is greater than or equal to the number of at least one video clip minus one, and the audio change points include time points at which change in audio feature satisfies a preset condition. The method includes obtaining a video file by synthesizing the at least one video clip and the target audio based on the audio change points included in the target audio.

According to a second aspect of the implementations of the disclosure, a video synthesis device is provided. The video synthesis device includes an acquisition module configured to acquire at least one video clip. The video synthesis device includes an synthesis module configured to obtain a video file by synthesizing the at least one video clip and the target audio based on the audio change points included in the target audio. The acquisition module is further configured to acquire a target audio suitable to video content based on the video content and the number of the at least one video clip. The number of the audio change points of the target audio is greater than or equal to the number of at least one video clip minus one, and the audio change points include time points at which change in audio feature satisfies a preset condition.

According to a third aspect of the disclosure, there is provided a terminal, the terminal includes a processor and a memory for storing instructions executable by the processor. The processor is configured to perform the above-mentioned video synthesis method.

According to a fourth aspect of the disclosure, there is provided a non-transitory computer-readable storage medium having a computer instruction stored thereon, when the computer instruction being executed by a processor of a terminal, enable the terminal to implement the above-mentioned video synthesis method.

According to the fifth aspect of the implementations of the disclosure, there is provided an application product, when the instructions in the application product are executed by the processor of a terminal, the terminal can execute the above-mentioned video synthesis method.

BRIEF DESCRIPTION OF THE DRAWINGS

The drawings herein are incorporated into the specification and constitute a part of the specification, show implementations that conform to the application, and are used with the specification to explain the principle of the application.

DETAILED DESCRIPTION

Figure 1:
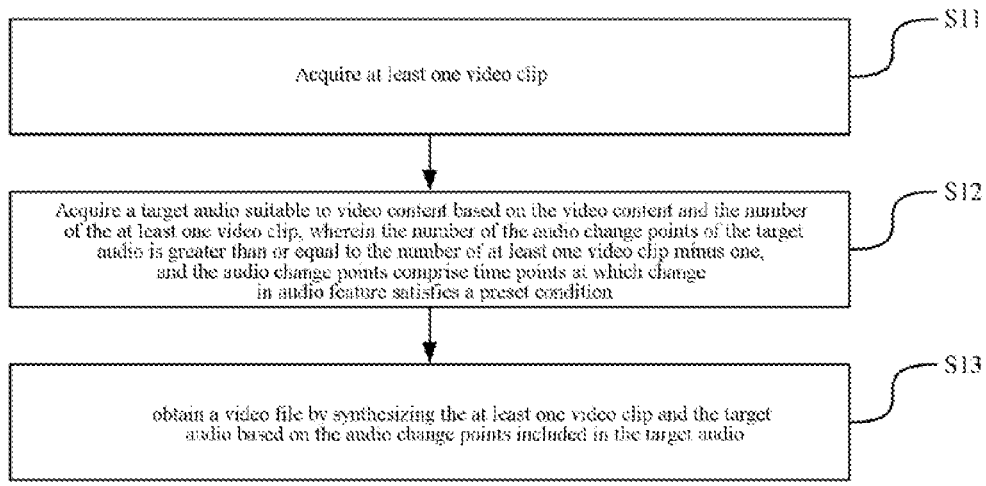
FIG. 1 is a flowchart of a video synthesis method according to an example implementation of the disclosure.

FIG. 1 is a flowchart of a video synthesis method according to an example implementation of the disclosure. As shown in FIG. 1, the video synthesis method can be used for a terminal and includes the following operations.

In operation S11, at least one video clip is acquired.

In operation S12, a target audio suitable to video content of the at least one video clip is acquired based on the video content of the at least one video clip and the number of the at least one video clip, and the number of audio change points of the target audio is greater than or equal to the number of at least one video clip minus one. In the disclosure, the audio change points include time points at which change in audio feature satisfies a preset condition.

In operation S13, based on the audio change points included in the target audio, the at least one video clip and the target audio are synthesized to obtain a video file.

The method provided by the implementations of the disclosure automatically adapts the target audio based on the video contents of the at least one video clip and the number of the clips, and synthesizes at least one video clip and the target audio into one video file according to the audio change points of the target audio, so as to make respective video clips to perfectly fit the audio change points of the target audio. This video synthesis method of synthesizing at least one video clip as a video having the target audio can improve the efficiency of video synthesis.

In some implementations, operation S12 includes: determining video content of each video clip by recognizing each video clip in the at least one video clip; determining a style corresponding to the video content of each video clip, respectively, based on the video content of each video clip; and in response to that respective video contents of the at least one video clip correspond to an identical style, acquiring an audio having the identical style and including audio change points whose number is greater than or equal to the number of the at least one video clip minus one as the target audio.

In some implementations, said acquiring the audio having the identical style and including audio change points as the target audio includes acquiring one audio having the identical style and including audio change points whose number is greater than or equal to the number of the at least one video clip minus one as the target audio; or acquiring multiple audios having the identical style and including audio change points whose total number is greater than or equal to the number of the at least one video clip minus one as the target audio.

In some implementations, after determining the style corresponding to video content of each video clip, the method further includes in response to that respective video contents of the at least one video clip corresponds to multiple styles, acquiring an audio having a style corresponding to the video content of a target video clip and including audio change points as the target audio. One video clip in the at least one video clip is determined as the target video clip.

In some implementations, said acquiring the audio having the style corresponding to the video content of the target video and including audio change points as the target audio includes acquiring one audio having the style corresponding to the video content of the target video clip and including audio change points whose number is greater than or equal to the number of the at least one video clip minus one as the target audio; or acquiring multiple audios having the style corresponding to the video content of the target video clip and including whose total number is greater than or equal to the number of the at least one video clip minus one as the target audio.

In some implementations, said determining the target video clip includes determining a video clip having a longest duration in the at least one video clip as a target video clip; or determining a video clip having a largest weight in the at least one video clip as a target video clip. The weight is used to indicate importance of the video clip.

In some implementations, after determining the style corresponding to video content of each video clip, the method further includes in response to that respective video contents of the at least one video clip corresponds to multiple styles, determining multiple video clip sets, and video contents of video clips in each of the video clip sets correspond to one of the multiple styles. The method further includes for each of the video clip sets, acquiring an audio having a style corresponding to the video contents of video clips in the video chip set and including audio change points as the target audio. A number of the audio change points is greater than or equal to the number of video clips in the video clip set minus one. The method further includes determining a plurality of acquired audio as the target audio.

In some implementations, said determining the video content of the each video clip of the at least one video clip includes for each of the at least one video clip, recognizing the video clip and determining at least one of a recognized target object and recognized environmental information in the video clip as the video content of the video clip.

In some implementations, said recognizing the video clip includes using a video recognition model; inputting the video clip into the video recognition model; and outputting at least one of the target object and the environmental information of the video clip. The video recognition model is configured to output at least one of the target object and the environmental information based on input video clip.

In some implementations, the video recognition model is acquired by following operations: acquiring a plurality of sample video clips and annotation information of each sample video clip. The annotation information includes at least one of the target object and the environmental information; and training, based on the plurality of sample video clips and the respective annotation information, a neural network model to obtain the video recognition model.

In some implementations, said respectively determining the style corresponding to video content of each video clip includes for each video clip, determining a style corresponding to the video content of the video clip based on the video content of the video clip and a rule between the video content and the corresponding style.

In some implementations, in response to the target audio including one audio, the audio change points of the target audio are the audio change points included in the one audio; and in response to the target audio including a plurality of audios, the audio change points of the target audios are the audio change points included in each audio of the plurality of audios; for any one audio, said acquiring the audio change points of the audio includes determining the audio change points of the audio based on amplitude information of the audio. Difference between corresponding amplitudes of the audio change points and an amplitude of a target time point in the audio is greater than an amplitude threshold, and the target time point in the audio being a time point whose time interval with the corresponding audio change point is less than a time threshold; or using an audio recognition model configured to output audio change points of the audio based on input audio.

In some implementations, the audio recognition model is acquired by following operations: acquiring a plurality of sample audios and audio change points marked in each sample audio; and training, based on the plurality of sample audios and the corresponding audio change points, a neural network model to obtain the audio recognition model.

In some implementations, said synthesizing the at least one video clip and the target audio to obtain the video file includes determining adjacent audio change points corresponding to respective video clips, respectively, based on the audio change points of the target audio and a play sequence of the at least one video clip; and for each video clip, marking the video clip and an audio clip corresponding to the video clip with a same timestamp based on the adjacent audio change points corresponding to the video clip, so as to synthesize the video file, the audio clip is an audio clip, in the target audio, between the adjacent audio change points corresponding to the video clip, and the timestamp includes a start timestamp and an end timestamp.

In some implementations, said respectively determining adjacent audio change points corresponding to respective video clips includes in response to that the target audio is one audio, determining the adjacent audio change points corresponding to respective video clips based on a position sequence of the audio change points of the target audio and the play sequence of the at least one video clip; and in response to that the target audio includes multiple audios, determining the adjacent audio change points corresponding to each video clip respectively, based on an audio play sequence of the multiple audios, a position sequence of the audio change points of each of the multiple audios and the video sequence of the at least one video clip.

In some implementations, said marking the video clip and the audio clip corresponding to the video clip with the same timestamp includes in response to that a duration of the video clip is equal to a duration of the audio clip corresponding to the video clip, marking the video clip and the audio clip corresponding to the video clip with the same timestamp; in response to that a duration of the video clip is greater than a duration of the audio clip corresponding to the video clip, trimming the video clip to obtain a trimmed video clip having the same duration as the audio clip, and marking the trimmed video clip and the audio clip corresponding to the video clip with the same timestamp; and in response to that a duration of the video clip is less than a duration of the audio clip corresponding to the video clip, trimming the audio clip corresponding to the video clip to obtain a trimmed audio clip having the same duration as the video clip, and marking the video clip and the trimmed audio clip corresponding to the video clip with the same timestamp.

Figure 2:
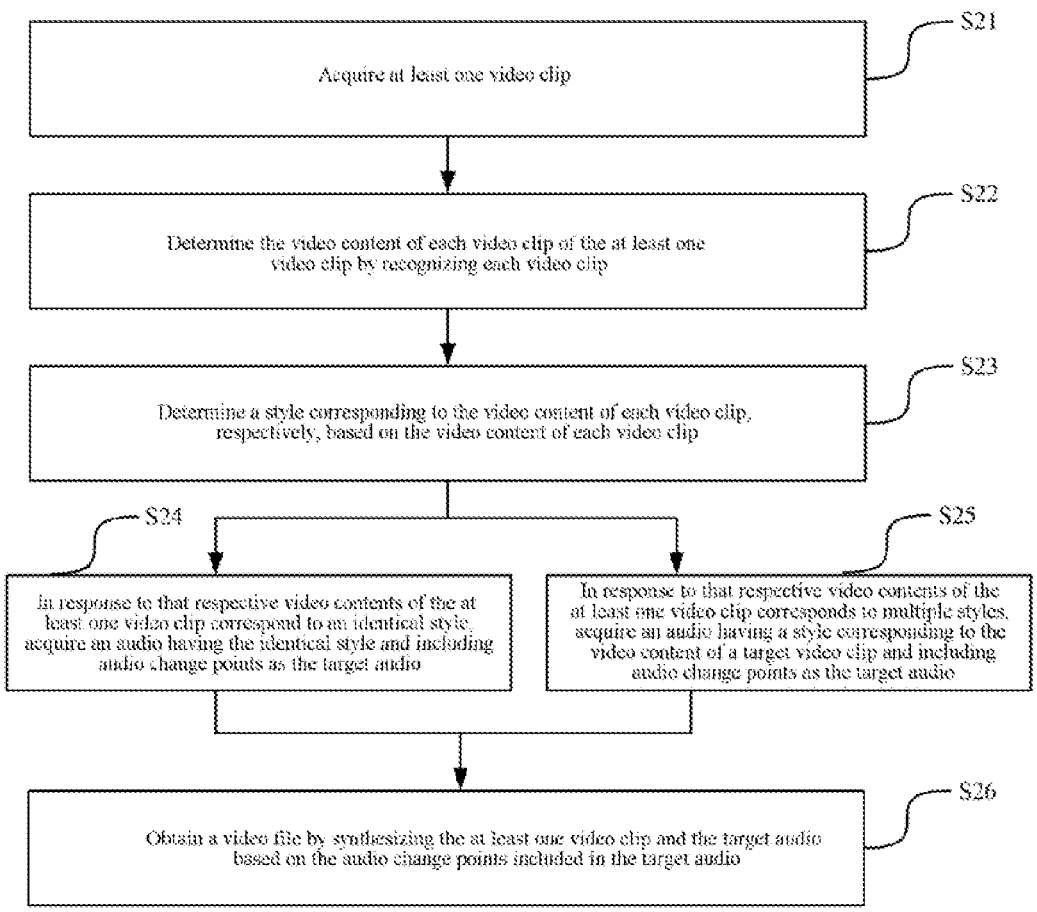
FIG. 2 is a flowchart showing a video synthesis method according to an example implementation of the disclosure.

FIG. 2 is a flowchart of a video synthesis method according to an example implementation of the disclosure. As shown in FIG. 2, the video synthesis method is used for a terminal and includes the following operations.

In operation S21, at least one video clip is acquired.

In some implementations of the present disclosure, the at least one video clip may be derived from a video. For example, user may select a video on the terminal, such as selecting a video from an album of the terminal. The user can trigger, through a corresponding operation, the terminal to cut the video into a plurality of video clips, and at least one video clip is selected from the plurality of video clips.

Of course, the at least one video clip can also be derived from multiple videos. For example, the user can select a plurality of videos on the terminal, such as selecting multiple videos from an album of the terminal. For example, user can trigger, through a corresponding operation, the terminal to cut the plurality of videos into multiple video clips, and at least one video clip is selected from the multiple video clips, which are derived from the plurality of videos. The disclosed implementation does not specifically limit the acquisition method of the video clips.

In operation S22, video content of each video clip is determined by recognizing each video clip in the at least one video clip.

In some implementations, the process of acquiring video content may include the following. For each video clip, the terminal may recognize the video clip, and treat at least one of a recognized target object and recognized environmental information in the video clip as the video content of the video clip.

The target object may be a person, animal, vehicle, etc., and the environmental information may be at home, on the road, in the field, at seaside, etc. For example, the terminal may use video recognition technology to recognize the video clip, and treat the recognition result as the video content of the video clip. The recognition result may include at least one of the target object and the environmental information.

In some implementations, the terminal may use a video recognition model which is used to output at least one of the target object and environmental information, in response to inputting the video clip. That is, the video clip is input into the video recognition model, and at least one of the target object and environmental information of the video clip is output from the video recognition model.

The process of acquiring video recognition model includes: acquiring a plurality of sample video clips and annotation information of each sample video clip. The annotation information includes at least one of the target object and the environmental information; and training, based on the plurality of sample video clips and the respective annotation information, a neural network model to obtain the video recognition model.

By collecting the plurality of sample video clips and manually marking at least one of the target object and environmental information in each sample video clip, the annotation information of each sample video clip is obtained. After that, the neural network model is trained by using a training set containing the plurality of sample video clips and corresponding annotation information, and then the trained neural network model is used as the video recognition model. When the video clip is to be recognized, the electronic device can input the video clip to the video recognition model, and recognize the video clip by using the video recognition model, so as to obtain at least one of the target object and the environmental information in the video clip.

Next, the target audio can be acquired by using the target object and/or environmental information in the video clip as the video content. The style of the acquired target audio by using the method above is consistent with the target object and/or environmental information in the video clip, which can guarantee better video synthesis effect.

In operation S23, a style corresponding to the video content of each video clip is determined respectively based on the video content of each video clip.

In the disclosure, the style can include a style regarding to the mood aspect, such as cheerfulness, sadness, etc., a style regarding to the environmental aspect, such as urban or rural, and the like.

In some implementations, for each video clip, the style corresponding to the video content of the video clip is determined based on the video content of the video clip and a corresponding rule between the video content and the style. For example, the corresponding rule between video content and style may be pre-stored on the terminal. In this way, when the video content of any video clip is obtained, the terminal can use the corresponding rule to determine the style corresponding to the obtained video content. For example, if the video content is a puppy, the corresponding style may be cheerful.

By pre-setting the corresponding rules between the video content and the style, the terminal can quickly find out the corresponding style according to the video content of the video clip to be synthesized, and then find out the audio that conforms to the style to perform the video synthesis, which improves video synthesis efficiency.

In operation S24, in response to that respective video contents of the at least one video clip correspond to an identical style, acquiring an audio having the identical style and including audio change points whose number is greater than or equal to the number of video clips minus one as the target audio.

The target audio may be one or more complete audios, or one or more audio clips, and the audio change point refers to a time point at which change in audio feature satisfies a preset condition. When the target audio is one audio, the audio change points of said target audio is one or more audio change points included in the one audio; when the target audio is combined by multiple audios, the audio change points of said target audio is one or more audio change points included in each one of the multiple audios.

In some implementations of the disclosure, if the video contents of respective video clips correspond to the same style, i.e., the identical style, the terminal can obtain an audio conforming to said identical style. In one implementation, the process for acquiring the target audio includes but is not limited to the following two methods:

In a first method, an audio having the identical style and including audio change points whose number is greater than or equal to the number of the at least one video clip minus one is acquired as the target audio.

The target audio acquired in this way is one audio. Based on said identical style, the terminal can obtain, from multiple pieces of audio, the one audio that conforms to said identical style and whose number of audio change points is greater than or equal to the number of video clips minus one, to use as the target audio. The multiple pieces of audio may be stored locally in the terminal, or downloaded from the network.

For example, the multiple pieces of audio may have corresponding description information in which the style of the multiple pieces of audio are recorded respectively, so that the terminal can search for multiple audios that conform to the style according to the description information of the multiple pieces of audio. In addition, every time the terminal acquires an audio that conforms to the style, the terminal can recognize the acquired audio and obtain one or more audio change points of the audio. In response to that the number of audio change points is greater than or equal to the number of video clips minus one, the currently acquired audio is taken as the target audio.

In a second method, multiple audios having the same style, i.e., the identical style and including audio change points whose total number is greater than or equal to the number of the at least one video clip minus one are acquired as the target audio.

The target audio obtained in this way is multiple pieces of audio. Based on said identical style, the terminal may obtain, from multiple pieces of audio, more than one audio that conforms to the identical style and whose total number of audio change points is greater than or equal to the number of video clips minus one, to use as the target audio. The terminal can search for an audio that conforms to said identical style based on the description information of the more than one audio. In response to acquiring, from the more than one audio, a first audio that conforms to the identical style, the terminal can obtain the audio change points of the acquired first audio by recognizing the acquired first audio. If the number of audio change points of the acquired first audio is less than the number of the video clips minus one, then continue to the acquired next audio that conforms to the identical style, and recognizing the acquired next audio to get the audio change points of the next audio. If the total number of audio change points of both the first audio and the next audio is greater than or equal to the number of the video clips minus one, then the first audio and the next audio may be used as the target audio. If the total number of audio change points of both the first audio and the next audio is less than the number of the video clips minus one, then continue to obtain the next audio that satisfies the identical style until the total number of audio change points of all the acquired audio is greater than or equal to the number of video clips minus one, and at this point, each currently acquired audio is used as the target audio.

In some implementations, for any one audio, the process of acquiring the audio change points of the audio includes: determining the audio change points of the audio based on amplitude information of the audio. Difference between corresponding amplitudes of the audio change points and an amplitude of a target time point in the audio is greater than an amplitude threshold, and the target time point in the audio is a time point whose time interval with the corresponding audio change point is less than a time threshold; or using an audio recognition model configured to output audio change points of the audio based on input audio. That is, the audio clip is input into the audio recognition model, and audio change points of the audio clip is output from the audio recognition model The amplitude information is one kind of audio feature of audio. The terminal can detect the audio by using an amplitude detection algorithm to obtain amplitude information at respective time point in the audio. The amplitude information can reflect an amplitude change rule of the audio, and in turn the terminal can determine a time point of the amplitude mutation from the amplitude information, that is, a time point having larger amplitude can be used as the audio change point, compared with nearby time points. These audio change points having larger amplitude are strong sound positions of the audio and are suitable for video transition or switching.

The terminal may also use an audio recognition model to recognize the audio, and use results output from the audio recognition model as the audio change points of the audio.

The process of acquiring the audio recognition model may include acquiring a plurality of sample audios and audio change points marked in each sample audio; and training, based on the plurality of sample audios and the corresponding audio change points, a neural network model to obtain the audio recognition model. The training process of the audio recognition model can be realized by a machine learning method. The audio change points in the sample audios can be obtained by manual marking. For example, a technician can collect multiple sample audios and manually mark the audio change points in each sample audio, such as marking, in the sample audio, one or more audio change points suitable for video transition or switching, such that the electronic device can obtain the audio change points marked in each sample audio. Then, the electronic device may train a neural network model using a training set which contains multiple sample audios and corresponding audio change points thereof, and uses the trained neural network model as an audio recognition model. In response to the need of acquiring the audio change points of the audio, the electronic device input the audio into the audio recognition model, so as to output the audio change points of the audio through the audio recognition model. By using the audio recognition model trained by machine learning to obtain the audio change points of the audio, the audio change points can be any audio change point marked during the training process that is suitable for video transition, which can ensure the recognition efficiency as well as selectivity and flexibility of the audio change points.

The audio change points may include a start time point of the audio. The audio change points may further include an end time point of the audio, and the audio change points may further include one or more time points between the start time point and the end time point of the audio. In response to determining that the audio change points of one audio are all time points between the start time point and the end time point, i.e., not including the start time point and the end time point of the audio, if the style of the audio matches the video content, and the number of audio change points of the audio is equal to the number of clips minus one, then the terminal can use the audio as the target audio.

In response to determining that the audio change points of one audio include the start time point or end time point of the audio, if the style of the audio matches the video content, and the number of audio change points of the audio is greater than or equal to the number of clips minus one, then the terminal can use the audio as the target audio.

In operation S25, in response to that respective video contents of the at least one video clip corresponds to multiple styles, acquiring an audio having a style corresponding to the video content of a target video clip and including audio change points whose number is greater than or equal to the number of video clips as the target audio. One video clip in the at least one video clip is determined as the target video clip.

In the implementations of the disclosure, if the video content of respective video clips correspond to multiple styles, the terminal can select one target video clip from the video clips, determine the style corresponding to the video content of the one target video clip, and in turn acquire an audio suitable for this style and having audio change points whose number is greater than or equal to the number of video clips minus one as the target audio. In some implementations, the process of acquiring the target audio includes: acquiring an audio whose style corresponds to the video content of the target video clip and the number of audio change points is greater than or equal to the number of the video clips minus one as the target audio; or, acquiring an audio whose style corresponds to the video content of the target video clip and the total number of audio change points is greater than or equal to the number of the video clips minus one as the target audio. The specific acquisition process is the same as the two methods of acquiring the target audio in the S24, and will not be repeated here.

In some implementations, the process of determining the target video clip includes: determining a video clip having a longest duration in the at least one video clip as a target video clip; or determining a video clip having a largest weight in the at least one video clip as a target video clip, the weight is used to indicate importance of the video clip.

The weight of the video clip can be obtained according to a weight allocation rule. For example, the weight allocation rule can be determined based on a target object contained in the video content of the video clip. Different kinds of target objects correspond to different weights. For example, the weight allocation rule can be determined based on environmental information contained in the video content of the video clip, and different environments correspond to different weights. As another example, the weight allocation rule can be jointly determined based on the target object contained in the video clip and the environmental information, such as by multiplying weight corresponding to target object and weight corresponding to the environmental information with corresponding coefficients respectively and summing, and then treating the sum result as the weight of the video clip.

By taking a longest video clip or a most important video clip as the target video clip, the target audio is acquired based on the video content of the target video clip, so that the acquired target audio can fit to a video clip having the most content or a video clip having the most important content.

It should be noted that, operation S25 is for the case when the video contents of respective video clips correspond to multiple styles and the target audio is acquired based on one of the video clips. In response to determining that the video contents correspond to multiple styles, the target audio can also be acquired based on the styles corresponding to respective video clips respectively. Accordingly, in some implementations, the process of acquiring the target video may include: in response to that respective video contents of the at least one video clip corresponds to multiple styles, determining multiple video clip sets, and video contents of video clips in each of the video clip sets correspond to one of the multiple styles; for each video clip set of the video clip sets, acquiring an audio having a style corresponding to the video contents of video clips in the video chip set and including audio change points whose number is greater than or equal to the number of video clips in the video clip set minus one as the target audio; and determining a plurality of acquired audio as the target audio.

The electronic device can determine the video clips in respective video clip whose video content corresponds to the same style as a video clip set, thus multiple video clip sets can be obtained, and the video contents of respective video clips in each video clip set correspond to the same style. Then, for each video clip set, the electronic device can obtain one or more audios through the same process as operation S24, and then determine all acquired audios as the target audio.

It should be noted that the foregoing operations S22 to S25 are some implementations of acquiring the target audio suitable for the video contents according to the video contents and the number of the video clips. This implementation method is based on a criterion that the audio style is used to judge whether to adapt. By determining, according to the video contents of respective video clips, the style corresponding to the video content of respective video clips or the style corresponding to one of the video clips, the target audio can be acquired based on the style and the number of video clips, which can ensure the accuracy of the target audio.

In fact, the terminal may also acquire the target audio suitable for the video content based on other information other than the style, such as operating frequency of the audio, popularity of the audio, etc., which is not specifically limited in the implementations of the disclosure.

In operation S26, based on the audio change points included in the target audio, the at least one video clip and the target audio are synthesized to obtain a video file.

In some implementations, the process of synthesizing video files includes the following operation a and operation b.

The operation a includes: based on the audio change points of the target audio and a play sequence of the at least one video clip, respectively determining adjacent audio change points corresponding to respective video clips.

In some implementations, when the target audio is one audio, the operation a may include: respectively determining adjacent audio change points corresponding to the respective video clips based on a position sequence of the audio change points of said one audio and the play sequence of the at least one video clip.

The play sequence of the at least one video clip may be specified by the user. For example, after acquiring the at least one video clip, the terminal may prompt the user to set the play sequence of the at least one video clip. The play sequence can also be automatically determined by the terminal. For example, if the at least one video clip is obtained by splitting a video, the terminal can adopt a play sequence of the at least one video clip in the original video. For another example, the terminal can determine the play sequence of the at least one video clip based on the duration or weight of the at least one video clip, for example, a video clip with a larger duration will be played earlier, or a video clip with a larger weight will be played earlier.

The electronic device can determine the adjacent audio change points corresponding to respective video clips, respectively, based on the play sequence of at least one video clip, in the order from front to back. The earlier the video clip played, the position of the corresponding adjacent audio change points in the audio are more at front. For example, the at least one video clip is video clip A, video clip B, and video clip C, and their play sequence is video clip A→video clip B→video clip C, and the position sequence of the audio change points of the target audio is the first time point→second time point→third time point. If the third time point is the end time point of the target audio, then the adjacent audio change points corresponding to video clip A are the start time point and the first time point of the target audio, the adjacent audio change points corresponding to the video clip B are the first time point and the second time point, and the adjacent audio change points corresponding to the video clip C are the second time point and the third time point.

In some implementations, when the target audio is one audio, the operation a may include: determining adjacent audio change points corresponding to the respective video clips, respectively, based on the play sequence of the multiple audios, a position sequence of the audio change points of each of the multiple audios and the play sequence of the at least one video clip.

The playing sequence of the multiple audios may be specified by the user, or may be automatically determined by the terminal, which is not specifically limited in the implementations of the disclosure.

The electronic device can determine multiple pairs of adjacent audio change points based on the play sequence of the multiple audios and the position sequence of the audio change points of each audio in the multiple audios. The pair of adjacent audio change points may be two audio change points whose positions are adjacent in the same audio. The pair of adjacent audio change points may also be two audio change points coming from two audios whose play sequence are adjacent. The electronic device can determine the adjacent audio change points corresponding to each video clip, based on the play sequence of at least one video clip, in the order from front to back. The earlier the video clip played, then the earlier the audio including the corresponding adjacent audio change points played, and the position of said audio in the multiple audios are more at front.

In the operation b, for each video clip, marking the video clip and an audio clip corresponding to the video clip with a same timestamp based on the adjacent audio change points corresponding to the video clip, so as to synthesize the video file. The audio clip is an audio clip, in the target audio, that between the adjacent audio change points corresponding to the video clip, and the timestamp includes a start timestamp and an end timestamp.

For each video clip, the terminal can determine the audio clip corresponding to the video clip in the target audio, based on the adjacent audio change points corresponding to the video clip, and in turn mark corresponding timestamps, which can specifically include the following cases.

In a first case, in response to that a duration of the video clip is equal to a duration of the audio clip corresponding to the video clip, marking the video clip and the audio clip corresponding to the video clip with the same timestamps.

In this case, the terminal does not need to trim the video clip or audio clip, and can directly mark the video clip and audio clip with the same start timestamp and end timestamp, and then the terminal can synthesize respective video clips and the target audio to obtain a video file. In this way, during the playing process of the video file, the video clip and the audio clip can be played synchronously.

In a second case, in response to that a duration of the video clip is greater than ae duration of an audio clip corresponding to the video clip, trimming the video clip to obtain a trimmed video clip having the same duration as the audio clip, and marking the trimmed video clip and the audio clip corresponding to the video clip with the same timestamps.

In this case, the terminal can first trim the video clip into a video clip with the same duration as the audio clip, and then mark the trimmed video clip and audio clip with the same start and end timestamps, so as to synthesize respective video clips and the target audio to obtain the video file. The respective video clip includes the trimmed video clip and a remaining video clip other than the video clip in the at least one video clip. The remaining video clip may be untrimmed or trimmed. In this way, during the playing process of the video file, the trimmed video clip and the audio clip can be played synchronously.

In a third case, in response to that the duration of the video clip is less than the duration of the audio clip corresponding to the video clip, trimming the audio clip corresponding to the video clip to obtain a trimmed audio clip having the same duration as the video clip, and marking the video clip and the trimmed audio clip corresponding to the video clip with the same timestamp.

In this case, the terminal can first trim the audio clip into an audio clip with the same duration as the video clip, and then mark the video clip and the trimmed audio clip with the same start and end timestamps, so as to synthesize respective video clips with the target audio to obtain a video file. The target audio includes the trimmed audio clip and a remaining audio clip in the target audio other than the audio clip, the remaining audio clip may be untrimmed or trimmed. In this way, during the playing process of the video file, the video clip and the trimmed audio clip can be played synchronously.

The method provided in the implementations of the disclosure automatically adapt the target audio based on video contents of the at least one video clip and the number of the video clips, and synthesize the at least one video clip and the target audio into a video file based on the audio change points of the target audio, so that respective video clips can perfectly fit the audio change points of the target audio. The video synthesis methods of the disclosure synthesize at least one video clip into a video having the target audio, which can improve the efficiency of video synthesis.

Figure 3:
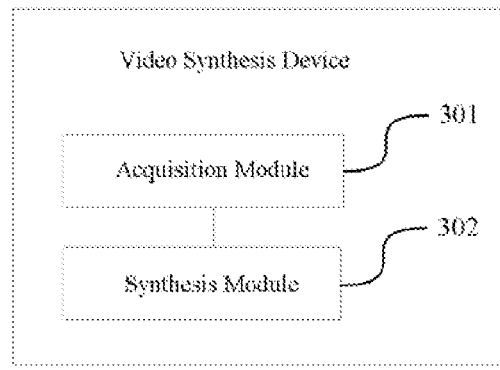
FIG. 3 is a block diagram showing a video synthesis device according to an example implementation of the disclosure.

FIG. 3 is a block diagram showing a video synthesis device according to some implementations of the disclosure. Referring to FIG. 2, the video synthesis device includes an acquisition module 301 and a synthesis module 302.

The acquisition module 301 is configured to acquire at least one video clip. The acquisition module 301 is further configured to acquire a target audio suitable to video content based on the video content and the number of the at least one video clip. The number of the audio change points of the target audio is greater than or equal to the number of at least one video clip minus one, and the audio change points include time points at which change in audio feature satisfies a preset condition. The synthesis module 302 is configured to synthesize, based on the audio change points included in the target audio, the at least one video clip and the target audio to obtain a video file.

In some implementations, the acquisition module 301 is configured to: determine the video content of each video clip of the at least one video clip by recognizing each video clips; determine a style corresponding to the video content of each video clip, respectively, based on the video content of each video clip; and in response to that respective video contents of the at least one video clip correspond to an identical style, acquire an audio having the identical style and including audio change points as the target audio.

In some implementations, the acquisition module 301 is configured to acquire one audio having the identical style and including audio change points whose number is greater than or equal to the number of the at least one video clip minus one as the target audio; or acquire multiple audios having the identical style and including audio change points whose total number is greater than or equal to the number of the at least one video clip minus one as the target audio.

In some implementations, the acquisition module 301 is configured to in response to that respective video contents of the at least one video clip corresponds to multiple styles, acquire an audio having a style corresponding to the video content of a target video clip and including audio change points as the target audio. One video clip in the at least one video clip is determined as the target video clip.

In some implementations, the acquisition module 301 is configured to acquire one audio having the style corresponding to the video content of the target video clip and including audio change points whose number is greater than or equal to the number of the at least one video clip minus one as the target audio; or acquire multiple audios having the style corresponding to the video content of the target video clip and including whose total number is greater than or equal to the number of the at least one video clip minus one as the target audio.

In some implementations, the acquisition module 301 is configured to determine a video clip having a longest duration in the at least one video clip as a target video clip; or determine a video clip having a largest weight in the at least one video clip as a target video clip. The weight is used to indicate importance of the video clip.

In some implementations, the acquisition module 301 is configured to in response to that respective video contents of the at least one video clip corresponds to multiple styles, determine multiple video clip sets, and video contents of video clips in each of the video clip sets correspond to one of the multiple styles; for each of the video clip sets, acquire an audio having a style corresponding to the video contents of video clips in the video chip set and including audio change points as the target audio. A number of the audio change points is greater than or equal to the number of video clips in the video clip set minus one; and determine a plurality of acquired audio as the target audio.

In some implementations, the acquisition module 301 is configured to for each of the at least one video clip, recognize the video clip and determine at least one of a recognized target object and recognized environmental information in the video clip as the video content of the video clip.

In some implementations, the acquisition module 301 is configured to for each of the at least one video clip, recognize the video clip and determine at least one of a recognized target object and recognized environmental information in the video clip as the video content of the video clip.

In some implementations, the acquisition module 301 is configured to use a video recognition model; input the video clip into the video recognition model; and output at least one of the target object and the environmental information of the video clip. The video recognition model is configured to output at least one of the target object and the environmental information based on input video clip.

In some implementations, the acquisition module 301 is configured to acquire a plurality of sample video clips and annotation information of each sample video clip. The annotation information includes at least one of the target object and the environmental information; and train, based on the plurality of sample video clips and the respective annotation information, a neural network model to obtain the video recognition model.

In some implementations, the acquisition module 301 is configured to for each video clip, determine a style corresponding to the video content of the video clip based on the video content of the video clip and a rule between the video content and the corresponding style.

In some implementations, in response to the target audio including one audio, the audio change points of the target audio are the audio change points included in the one audio; and in response to the target audio including a plurality of audios, the audio change points of the target audios are the audio change points included in each audio of the plurality of audios. The acquisition module 301 is configured to for any one audio, determine the audio change points of the audio based on amplitude information of the audio. Difference between corresponding amplitudes of the audio change points and an amplitude of a target time point in the audio is greater than an amplitude threshold, and the target time point in the audio being a time point whose time interval with the corresponding audio change point is less than a time threshold; or use an audio recognition model configured to output audio change points of the audio based on inputted audio.

In some implementations, the acquisition module 301 is configured to acquire a plurality of sample audios and audio change points marked in each sample audio; and train, based on the plurality of sample audios and the corresponding audio change points, a neural network model to obtain the audio recognition model.

In some implementations, the acquisition module 301 is configured to determine adjacent audio change points corresponding to respective video clips, respectively, based on the audio change points of the target audio and a play sequence of the at least one video clip; and for each video clip, mark the video clip and an audio clip corresponding to the video clip with a same timestamp based on the adjacent audio change points corresponding to the video clip, so as to synthesize the video file. The audio clip is an audio clip, in the target audio, that between the adjacent audio change points corresponding to the video clip, and the timestamp includes a start timestamp and an end timestamp.

In some implementations, the acquisition module 301 is configured to in response to that the target audio is one audio, determine the adjacent audio change points corresponding to respective video clips based on a position sequence of the audio change points of the target audio and the play sequence of the at least one video clip; and in response to that the target audio includes multiple audios, respectively determine the adjacent audio change points corresponding to respective video clips, based on an audio play sequence of the multiple audios, a position sequence of the audio change points of each of the multiple audios and the video sequence of the at least one video clip.

In some implementations, the acquisition module 301 is configured to in response to that a duration of the video clip is equal to a duration of the audio clip corresponding to the video clip, mark the video clip and the audio clip corresponding to the video clip with the same timestamp; in response to that a duration of the video clip is greater than a duration of the audio clip corresponding to the video clip, trim the video clip to obtain a trimmed video clip having the same duration as the audio clip, and mark the trimmed video clip and the audio clip corresponding to the video clip with the same timestamp; and in response to that a duration of the video clip is less than a duration of the audio clip corresponding to the video clip, trim the audio clip corresponding to the video clip to obtain a trimmed audio clip having the same duration as the video clip, and mark the video clip and the trimmed audio clip corresponding to the video clip with the same timestamp.

The devices provided in the implementations of the disclosure automatically adapt the target audio based on video contents of the at least one video clip and the number of the video clips, and synthesize the at least one video clip and the target audio into a video file based on the audio change points of the target audio, so that respective video clips can perfectly fit the audio change points of the target audio. The video synthesis devices of the disclosure synthesize at least one video clip into a video having the target audio, which can improve the efficiency of video synthesis.

Regarding the devices in the foregoing implementations, the specific manner in which each module performs the operation has been described in detail in the implementations of the corresponding methods, and a detailed description will not be given here.

Figure 4:
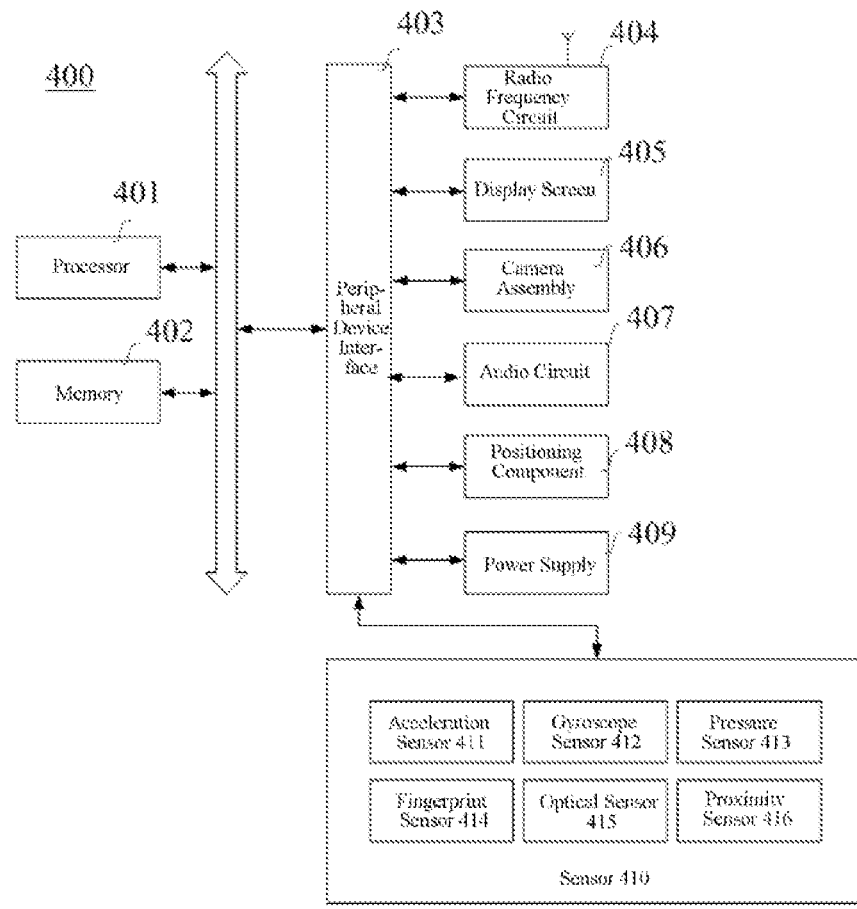
FIG. 4 is a block diagram showing a terminal according to an example implementation of the disclosure.

FIG. 4 is a block diagram showing a terminal 400 according to an example implementation of the present disclosure. The terminal 400 can be a smart phone, a tablet computer, an MP3 (Moving Picture Experts Group Audio Layer III) Player, an MP4 (Moving Picture Experts Group Audio Layer IV) Player, a laptop or desktop computer, and the like. The terminal 400 may also be called user equipment, a portable terminal, a laptop terminal, a desktop terminal and other names.

Generally, the terminal 400 includes a processor 401 and a memory 402.

The processor 401 may include one or more processing cores, such as a 4-core processor, an 8-core processor, and so on. The processor 401 may be implemented by at least one hardware form among Digital Signal Processing (DSP), Field-Programmable Gate Array (FPGA), and Programmable Logic Array (PLA). The processor 401 may also include a main processor and a coprocessor. The main processor is a processor used to process data in an awake state, also called a Central Processing Unit (CPU); and the coprocessor is a low-power processor used to process data in a standby state. In some implementations, the processor 401 may be integrated with a Graphics Processing Unit (GPU), and the GPU is used for rendering and drawing content that needs to be displayed on the display screen. In some implementations, the processor 401 may further include an Artificial Intelligence (AI) processor, and the AI processor is used to process calculation operations related to machine learning.

The memory 402 may include one or more computer-readable storage medium, which may be non-transitory. The memory 402 may also include a high-speed random access memory and a non-volatile memory, such as one or more magnetic disk storage devices and flash memory storage devices. In some implementations, the non-transitory computer-readable storage medium in the memory 402 is used to store at least one instruction, and the at least one instruction is used to be executed by the processor 401 to implement the video synthesis methods provided in the method implementations of the disclosure.

In some implementations, the terminal 400 may optionally further include: a peripheral device interface 403 and at least one peripheral device. The processor 401, the memory 402, and the peripheral device interface 403 may be connected by a bus or a signal line. Each peripheral device can be connected to the peripheral device interface 403 through a bus, a signal line or a circuit board. For example, the peripheral device includes at least one of a radio frequency circuit 404, a display screen 405, a camera assembly 406, an audio circuit 407, a positioning component 408, and a power supply 409.

The peripheral device interface 403 may be used to connect at least one peripheral device related to Input/Output (I/O) to the processor 401 and the memory 402. In some implementations, the processor 401, the memory 402, and the peripheral device interface 403 are integrated on the same chip or circuit board. In some other implementations, any one or two of the processor 401, the memory 402, and the peripheral device interface 403 can be implemented on separate chips or circuit boards, which are not limited in the implementations of the disclosure.

The radio frequency circuit 404 is used for receiving and transmitting Radio Frequency (RF) signals, also called electromagnetic signals. The radio frequency circuit 404 communicates with a communication network and other communication devices through electromagnetic signals. The radio frequency circuit 404 converts electrical signals into electromagnetic signals for transmission, or converts received electromagnetic signals into electrical signals. Optionally, the radio frequency circuit 404 includes an antenna system, an RF transceiver, one or more amplifiers, a tuner, an oscillator, a digital signal processor, a codec chipset, a user identity module card, and so on. The radio frequency circuit 404 can communicate with other terminals through at least one wireless communication protocol. The wireless communication protocol includes, but is not limited to: metropolitan area networks, various generations of mobile communication networks (2G, 3G, 4G and 5G), wireless local area networks and/or Wireless Fidelity (Wi-Fi) networks. In some implementations, the radio frequency circuit 404 may also include a circuit related to Near Field Communication (NFC), which is not limited in the disclosure.

The display screen 405 is used to display a User Interface (UI). The UI can include graphics, text, icons, videos, and any combination thereof. When the display screen 405 is a touch display screen, the display screen 405 also has the ability to collect touch signals on or above the surface of the display screen 405. The touch signal can be input to the processor 401 as a control signal for processing. At this time, the display screen 405 may also be used to provide virtual buttons and/or virtual keyboards, also called soft buttons and/or soft keyboards. In some implementations, there may be one display screen 405, which is provided as a front panel of the terminal 400. In other implementations, there may be at least two display screens 405, which are respectively arranged on different surfaces of the terminal 400 or in a folding design. In still other implementations, the display screen 405 may be a flexible display screen, which is disposed on the curved surface or the folding surface of the terminal 400. Furthermore, the display screen 405 can also be set as a non-rectangular irregular figure, that is, a special-shaped screen. The display screen 405 can be made of materials such as Liquid Crystal Display (LCD), Organic Light-Emitting Diode (OLED), etc.

The camera assembly 406 is used to capture images or videos. Optionally, the camera assembly 406 includes a front camera and a rear camera. Generally, the front camera is set on the front panel of the terminal, and the rear camera is set on the back of the terminal. In some implementations, there are at least two rear cameras, each of which is one of a main camera, a depth-of-field camera, a wide-angle camera, and a telephoto camera, so as to implement the fusion of the main camera and the depth-of-field camera to realize background blur function, implement the fusion of the main camera and the wide-angle camera to realize panoramic shooting and Virtual Reality (VR) shooting functions or other fusion shooting functions. In some implementations, the camera assembly 406 may also include a flash. The flash can be a single-color temperature flash or a dual-color temperature flash. Dual color temperature flash refers to a combination of warm light flash and cold light flash, which can be used for light compensation under different color temperatures.

The audio circuit 407 may include a microphone and a speaker. The microphone is used to collect sound waves from the user and the environment, and convert the sound waves into electrical signals and input them to the processor 401 for processing, or input to the radio frequency circuit 404 to implement voice communication. For the purpose of stereo collection or noise reduction, there may be multiple microphones, which are respectively set in different parts of the terminal 400. The microphone can also be an array microphone or an omnidirectional collection microphone. The speaker is used to convert the electrical signal from the processor 401 or the radio frequency circuit 404 into sound waves. The speaker can be a traditional membrane speaker or a piezoelectric ceramic speaker. When the speaker is a piezoelectric ceramic speaker, not only can the electrical signal be converted into human audible sound waves, but also the electrical signal can be converted into human inaudible sound waves for purposes such as distance measurement. In some implementations, the audio circuit 407 may also include a headphone jack.

The positioning component 408 is used to locate the current geographic location of the terminal 400 to implement navigation or Location Based Service (LBS). The positioning component 408 may be a positioning component based on the Global Positioning System (GPS) of the United States, the Beidou system of China, the Grenas system of Russia, or the Galileo system of the European Union.

The power supply 409 is used to supply power to various components in the terminal 400. The power source 409 may be alternating current, direct current, disposable batteries, or rechargeable batteries. When the power source 409 includes a rechargeable battery, the rechargeable battery may support wired charging or wireless charging. The rechargeable battery can also be used to support fast charging technology.

In some implementations, the terminal 400 further includes one or more sensors 410. The one or more sensors 410 include, but are not limited to: an acceleration sensor 411, a gyroscope sensor 412, a pressure sensor 413, a fingerprint sensor 414, an optical sensor 415, and a proximity sensor 416.

The acceleration sensor 411 can detect the magnitude of acceleration on the three coordinate axes of the coordinate system established by the terminal 400. For example, the acceleration sensor 411 can be used to detect the components of gravitational acceleration on three coordinate axes. The processor 401 may control the touch screen 405 to display the user interface in a horizontal view or a vertical view according to the gravity acceleration signal collected by the acceleration sensor 411. The acceleration sensor 411 may also be used for the collection of game or user motion data.

The gyroscope sensor 412 can detect the body direction and rotation angle of the terminal 400. Furthermore, the gyroscope sensor 412 can cooperate with the acceleration sensor 411 to collect the user's 3D actions on the terminal 400. According to the data collected by the gyroscope sensor 412, the processor 401 can implement the following functions: motion sensing (for example, changing the UI according to a user's tilt operation), image stabilization during shooting, game control, and inertial navigation.

The pressure sensor 413 may be arranged on the side frame of the terminal 400 and/or the lower layer of the touch screen 405. When the pressure sensor 413 is arranged on the side frame of the terminal 400, the user's holding signal of the terminal 400 can be detected, and the processor 401 performs left and right hand recognition or quick operation according to the holding signal collected by the pressure sensor 413. When the pressure sensor 413 is arranged on the lower layer of the touch display screen 405, the processor 401 controls the operability controls on the UI interface according to the user's pressure operation on the touch display screen 405. The operability control includes at least one of a button control, a scroll bar control, an icon control, and a menu control.

The fingerprint sensor 414 is used to collect the user's fingerprint. The processor 401 identifies the user's identity according to the fingerprint collected by the fingerprint sensor 414, or the fingerprint sensor 414 identifies the user's identity according to the collected fingerprint. In response to recognizing that the user's identity is a trusted identity, the processor 401 authorizes the user to perform related sensitive operations, including unlocking the screen, viewing encrypted information, downloading software, paying, and changing settings. The fingerprint sensor 414 may be provided on the front, back or side of the terminal 400. When a physical button or a manufacturer logo is provided on the terminal 400, the fingerprint sensor 414 can be integrated with the physical button or the manufacturer logo.

The optical sensor 415 is used to collect the ambient light intensity. In some implementations, the processor 401 may control the display brightness of the touch screen 405 according to the ambient light intensity collected by the optical sensor 415. Specifically, in response to determining that the ambient light intensity is high, the display brightness of the touch screen 405 is increased. In response to determining that the ambient light intensity is low, the display brightness of the touch screen 405 is decreased. In another implementations, the processor 401 may also dynamically adjust the shooting parameters of the camera assembly 406 according to the ambient light intensity collected by the optical sensor 415.

The proximity sensor 416, also called a distance sensor, is usually provided on the front panel of the terminal 400. The proximity sensor 416 is used to collect the distance between the user and the front of the terminal 400. In some implementations, in response to determining that the proximity sensor 416 detects that the distance between the user and the front of the terminal 400 gradually decreases, the processor 401 controls the touch screen 405 to switch from a bright-screen state to a resting-screen state. In response to determining that the proximity sensor 416 detects that the distance between the user and the front of the terminal 400 gradually increases, the processor 401 controls the touch display screen 405 to switch from the resting-screen state to the bright-screen state.

In some implementations of the disclosure, a non-transitory computer-readable storage medium is also provided. When the instructions in the storage medium are executed by the processor of the terminal, the terminal can execute the video synthesis method described above in the disclosure.

In some implementations of the disclosure, an application product is also provided. When the instructions in the application product are executed by the processor of the terminal, the terminal can execute the video synthesis method described above in the disclosure.

This disclosure is intended to cover any variations, uses, or adaptive changes of the disclosure. These variations, uses, or adaptive changes follow the general principles of the disclosure and include common knowledge or conventional technical means in the technical field not disclosed in the disclosure. The description and the implementations are only regarded as example, and the true scope and spirit of the disclosure are pointed out by the following claims.

It should be understood that the disclosure is not limited to the precise structure described above and shown in the drawings, and various modifications and changes can be made without departing from its scope. The scope of the disclosure is only limited by the appended claims.

What is claimed is:

1. A video synthesis method, comprising:
   acquiring at least one video clip;
   acquiring a target audio suitable to video content based on the video content and the number of the at least one video clip, wherein a number of audio change points of the target audio is greater than or equal to a number of the at least one video clip minus one, and the audio change points comprise time points at which change in audio feature satisfies a preset condition; and
   obtaining a video file by synthesizing the at least one video clip and the target audio based on the audio change points included in the target audio,
   wherein said acquiring the target audio comprises:
   determining the video content of each video clip of the at least one video clip by recognizing each video clip;
   determining a style corresponding to the video content of each video clip, respectively, based on the video content of each video clip;
   in response to determining that respective video contents of the at least one video clip correspond to an identical style, acquiring an audio having the identical style and including audio change points as the target audio;
   wherein, said acquiring the audio having the identical style and including the audio change points as the target audio comprises:
   acquiring multiple audios having the identical style and including the audio change points whose total number is greater than or equal to the number of the at least one video clip minus one as the target audio, comprising:
   acquiring a first audio having the identical style, and obtaining a number of audio change points of the first audio;
   in response to determining that the number of audio change points of the first audio is less than the number of the at least one video clips minus one, continuing to acquire a next audio having the identical style, until that a total number of audio change points of all currently acquired audios having the identical style is greater than or equal to the number of the at least one video clips minus one.

2. The video synthesis method according to claim 1, wherein said acquiring the audio having the identical style and including the audio change points as the target audio further comprises:
   acquiring one audio having the identical style and including the audio change points whose number is greater than or equal to the number of the at least one video clip minus one as the target audio.

3. The video synthesis method according to claim 1, said acquiring the audio having the style corresponding to the video content of the target video and including the audio change points as the target audio comprising:
   acquiring one audio having the style corresponding to the video content of the target video clip and including the audio change points whose number is greater than or equal to the number of the at least one video clip minus one as the target audio; or
   acquiring multiple audios having the style corresponding to the video content of the target video clip and including whose total number is greater than or equal to the number of the at least one video clip minus one as the target audio.

4. The video synthesis method according to claim 1, wherein after determining a style corresponding to the video content of each video clip, respectively, based on the video content of each video clip, the method further comprises:
   in response to that respective video contents of the at least one video clip corresponds to multiple styles, determining multiple video clip sets, and video contents of video clips in each of the video clip sets correspond to one of the multiple styles;
   acquiring an audio having a style corresponding to the video contents of video clips in the video chip set and including the audio change points as the target audio for each video clip set, wherein the number of the audio change points is greater than or equal to the number of video clips in the video clip set minus one; and
   determining a plurality of acquired audio as the target audio.

5. The video synthesis method according to claim 1, said determining the video content of the respective video clips of the at least one video clip comprising:
   recognizing the video clip and determining a recognized target object and/or recognized environmental information in the video clip as the video content of the video clip for each video clip.

6. The video synthesis method according to claim 5, said recognizing the video clip comprising:
   outputting at least one of the target object and the environmental information of the video clip by inputting the video clip into a video recognition model,
   wherein the video recognition model is configured to output at least one of the target object and the environmental information based on input video clip.

7. The video synthesis method according to claim 6, wherein the video recognition model is acquired by:
   acquiring a plurality of sample video clips and annotation information of each sample video clip, wherein the annotation information includes at least one of the target object and the environmental information; and
   obtaining the video recognition model by training a neural network model based on the plurality of sample video clips and the respective annotation information.

8. The video synthesis method according to claim 1, said respectively determining the style corresponding to video content of the respective video clips comprising:

determining a style corresponding to the video content of the video clip based on the video content of the video clip and a rule between the video content and the corresponding style for each video clip.

9. The video synthesis method according to claim 1, further comprising:
in response to the target audio including one audio, the audio change points of the target audio are the audio change points included in the one audio;
in response to the target audio including a plurality of audios, the audio change points of the target audios are the audio change points included in each audio of the plurality of audios;
for any one audio, acquiring the audio change points of the audio comprising:
determining the audio change points of the audio based on amplitude information of the audio, wherein difference between corresponding amplitudes of the audio change points and an amplitude of a target time point in the audio is greater than an amplitude threshold, and the target time point in the audio being a time point whose time interval with the corresponding audio change point is less than a time threshold; or,
outputting the audio change points of the audio by an audio recognition model based on input audio.

10. The video synthesis method according to claim 9, wherein the audio recognition model is acquired by following operations:
acquiring a plurality of sample audios and the audio change points marked in each sample audio; and
obtaining the audio recognition model by training a neural network model based on the plurality of sample audios and the corresponding audio change points.

11. The video synthesis method according to claim 1, said synthesizing the at least one video clip and the target audio to obtain the video file comprising:
determining adjacent audio change points corresponding to respective video clips based on the audio change points of the target audio and a play sequence of the at least one video clip; and
marking the video clip and an audio clip corresponding to the video clip with a same timestamp based on the adjacent audio change points corresponding to the video clip for each video clip, and synthesizing the video file, wherein the audio clip is an audio clip, in the target audio, between the adjacent audio change points corresponding to the video clip, and the timestamp includes a start timestamp and an end timestamp.

12. The video synthesis method according to claim 11, said respectively determining adjacent audio change points corresponding to respective video clips comprising:
in response to that the target audio is one audio, determining the adjacent audio change points corresponding to respective video clips based on a position sequence of the audio change points of the target audio and the play sequence of the at least one video clip; and
in response to that the target audio comprises multiple audios, determining the adjacent audio change points corresponding to each video clip respectively, based on an audio play sequence of the multiple audios, a position sequence of the audio change points of each of the multiple audios and the video sequence of the at least one video clip.

13. The video synthesis method according to claim 11, said marking the video clip and the audio clip corresponding to the video clip with the same timestamp comprising:

in response to that a duration of the video clip is equal to a duration of the audio clip corresponding to the video clip, marking the video clip and the audio clip corresponding to the video clip with the same timestamp;
in response to that a duration of the video clip is greater than a duration of the audio clip corresponding to the video clip, trimming the video clip to obtain a trimmed video clip having the same duration as the audio clip, and marking the trimmed video clip and the audio clip corresponding to the video clip with the same timestamp; and
in response to that a duration of the video clip is less than a duration of the audio clip corresponding to the video clip, trimming the audio clip corresponding to the video clip to obtain a trimmed audio clip having the same duration as the video clip, and marking the video clip and the trimmed audio clip corresponding to the video clip with the same timestamp.

14. The video synthesis method according to claim 1, further comprising:
in response to determining that respective video contents of the at least one video clip corresponds to multiple styles, acquiring an audio having a style corresponding to the video content of a target video clip and including audio change points as the target audio, wherein one video clip in the at least one video clip is determined as the target video clip.

15. The video synthesis method according to claim 14, wherein the process of determining the target video clip comprises:
determining a video clip having a largest weight in the at least one video clip as the target video clip, wherein the weight being used to indicate importance of the video clip.

16. A terminal, comprising:
a processor; and
a memory for storing instructions executable by the processor;
wherein, the processor is configured to:
acquire at least one video clip;
acquire a target audio suitable to video content based on the video content and the number of the at least one video clip, wherein a number of audio change points of the target audio is greater than or equal to a number of the at least one video clip minus one, and the audio change points comprise time points at which change in audio feature satisfies a preset condition; and
obtain a video file by synthesizing the at least one video clip and the target audio based on the audio change points included in the target audio,
wherein the processor is further configured to:
determine the video content of each video clip of the at least one video clip by recognizing each video clip;
determine a style corresponding to the video content of each video clip, respectively, based on the video content of each video clip;
in response to determining that respective video contents of the at least one video clip correspond to an identical style, acquire an audio having the identical style and including audio change points as the target audio;
wherein the processor is further configured to acquire multiple audios having the identical style and including the audio change points whose total number is greater than or equal to the number of the at least one video clip minus one as the target audio, wherein the processor is further configured to:

acquire a first audio having the identical style, and obtain a number of audio change points of the first audio;

in response to determining that the number of audio change points of the first audio is less than the number of the at least one video clips minus one, continue to acquire a next audio having the identical style, until that a total number of audio change points of all currently acquired audios having the identical style is greater than or equal to the number of the at least one video clips minus one.

17. A non-transitory computer-readable storage medium having a computer instruction stored thereon, when the computer instruction being executed by a processor of a terminal, enabling the terminal to implement a video synthesis method, the video synthesis method comprising:

acquiring at least one video clip;

acquiring a target audio suitable to video content based on the video content and the number of the at least one video clip, wherein a number of audio change points of the target audio is greater than or equal to a number of the at least one video clip minus one, and the audio change points comprise time points at which change in audio feature satisfies a preset condition; and obtaining a video file by synthesizing the at least one video clip and the target audio based on the audio change points included in the target audio;

wherein said acquiring the target audio comprises:

determining the video content of each video clip of the at least one video clip by recognizing each video clip;

determining a style corresponding to the video content of each video clip, respectively, based on the video content of each video clip;

in response to determining that respective video contents of the at least one video clip correspond to an identical style, acquiring an audio having the identical style and including audio change points as the target audio;

wherein said acquiring the audio having the identical style and including the audio change points as the target audio comprises:

acquiring multiple audios having the identical style and including the audio change points whose total number is greater than or equal to the number of the at least one video clip minus one as the target audio, comprising:

acquiring a first audio having the identical style, and obtaining a number of audio change points of the first audio;

in response to determining that the number of audio change points of the first audio is less than the number of the at least one video clips minus one, continuing to acquire a next audio having the identical style, until that a total number of audio change points of all currently acquired audios having the identical style is greater than or equal to the number of the at least one video clips minus one.

* * * * *